United States Patent Office 3,458,288
Patented July 29, 1969

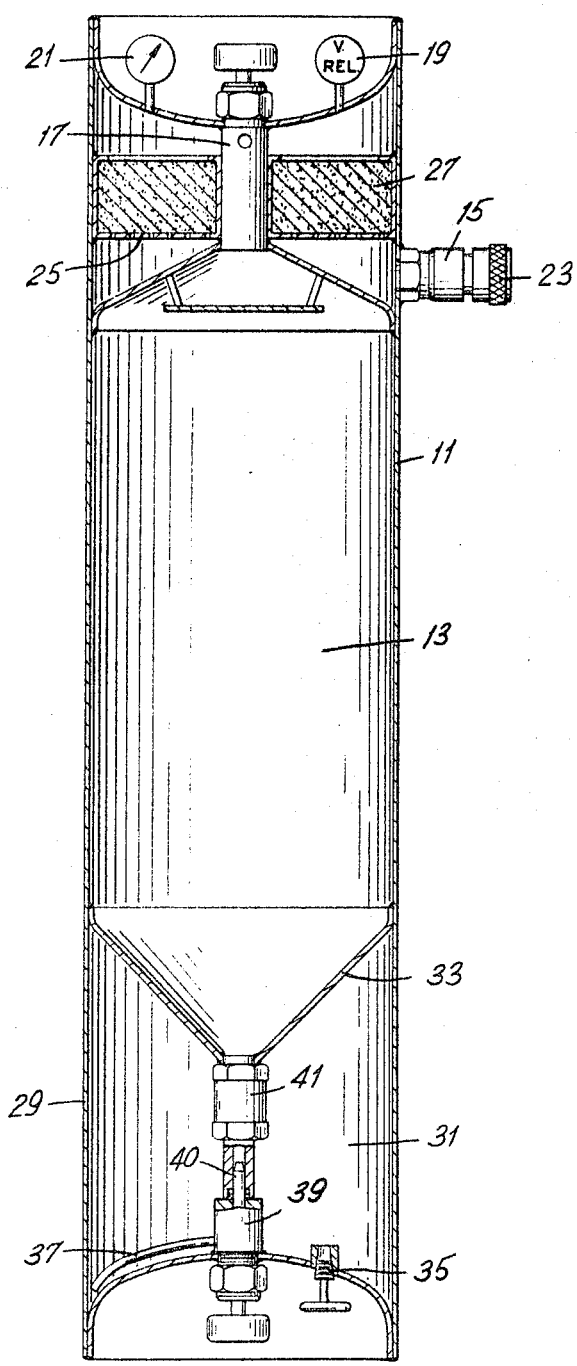

3,458,288
HYDROGEN GENERATOR
Paul G. Lafyatis, Bay Village, and Jack E. Rothfleisch, Westlake, Ohio, assignors to Union Carbide Corporation, a corporation of New York
Filed Dec. 28, 1965, Ser. No. 517,086
Int. Cl. B01j 7/02
U.S. Cl. 23—282                     3 Claims

ABSTRACT OF THE DISCLOSURE

A hydrogen generator for producing hydrogen by hydrolysis of a fuel in which a high density liquid is used to prevent formation of insoluble reaction products at the point of introduction of the fuel into the hydrolysis reaction chamber. Liquid organic borohydrides are exemplified as the fuel being hydrolyzed to generate hydrogen and mercury is exemplified as the high density liquid being used as a trap which allows the passage of the liquid fuel into the reaction chamber but prevents the insoluble reaction products from clogging the fuel nozzle.

---

This invention relates to a novel apparatus for generating hydrogen gas. In one aspect, this invention relates to a novel process for generating hydrogen gas at a relatively constant flow rate. In a further aspect, this invention relates to a compact, portable, self-contained apparatus having the ability to vary the hydrogen production rate automatically as required to satisfy a variable consumption rate.

Hydrogen, as is the case with many industrial gases, is usually supplied in its gaseous form under pressure in steel cylinders having capacities of several hundred cubic feet. As hydrogen is needed, it is merely withdrawn from the cylinder through one or more pressure reduction valves to provide a relatively constant flow of gas. Although the use of cylinder hydrogen is economically attractive and adequate for most industrial and commercial purposes, there are some instances wherein a mobile, lightweight source is desired. For example, recent developments in fuel cell technology have resulted in lightweight, compact units capable of providing a continuous source of electricity by the catalytic interaction of hydrogen and oxygen. These units are of particular use in providing electricity for portable communications systems, radios, motor vehicles, and like applications. Inasmuch as oxygen can be obtained from the air, the only other fuel required is hydrogen. However, in order to maintain the mobility of the fuel cell unit, the hydrogen must be furnished from a compact and lightweight source. Cylinder hydrogen wherein the gas is stored under pressure does not readily lend itself to use in those instances wherein a compact, lightweight unit is desired.

Prior to the instant invention, various kinds of apparatus have been reported in the literature for generating hydrogen. For example, U.S. Patents 2,721,789 and 3,098,769 relate to devices for the generation of hydrogen from such sources as sodium hydroxide and finely divided aluminum, or solid borohydride such as sodium borohydride. In contrast, the hydrogen generator of this invention utilizes as the source of hydrogen entirely new compositions which heretofore are not reported in the literature. Although these novel compositions provide a convenient source of hydrogen gas, it was observed that their use was accompanied by the formation of an insoluble, solid reaction by-product which rendered them unsuitable for use in hydrogen generators heretofore known. In all instances, it was discovered that the solid by-product plugged reaction lines and valves and materially affected the overall efficiency and operation of the unit.

It has now been found that the aforementioned disadvantages can largely be overcome by the use of the apparatus of this invention. Accordingly, one or more of the following objects will be achieved by the practice of the present invention.

It is an object of this invention to provide a novel apparatus for the generation of hydrogen gas. Another object of this invention is to provide a novel apparatus for generating hydrogen gas at a relatively constant flow rate without plugging or fouling of lines. A further object of this invention is to provide a portable, lightweight, self-contained apparatus having the ability to vary the hydrogen production rate automatically as required to satisfy a variable consumption rate. Another object is to provide a portable apparatus, suitable as a source of hydrogen gas for fuel cells. A further object is to provide a novel process for the generation of hydrogen gas at a relatively constant flow rate. These and other objects will readily become apparent to those skilled in the art in the light of the teachings herein set forth.

In its broad aspect, the present invention relates to a hydrogen generator which is capable of utilizing as a source of hydrogen, certain novel composition as hereinafter defined and which has the ability to vary the hydrogen production rate automatically to satisfy a variable consumption rate. Although these compositions are excellent sources of hydrogen, they react to give insoluble by-products which normally would render them unsuitable for use in conventional hydrogen generators. However, the generator of this invention is specifically designed to overcome the shortcomings of known generators and provides a compact, lightweight unit capable of providing hydrogen gas, as desired, without the fouling or plugging of lines. The invention will now be described in greater detail with reference to the appended drawing.

The single drawing is a cross-sectional view of one embodiment of the apparatus according to the instant invention.

The apparatus comprises an upper first body section 11 having a reaction chamber 13, a passage 15 connecting the upper portion of the reaction chamber to the exterior of the apparatus, and a block valve 17 to prevent contamination of filter and dessicant with acid during storage. The upper body section can also be provided with a pressure relief valve 19 and an exterior pressure indicator 21. The upper body section is also equipped with quick disconnect coupling 23 for attachment to a conduit through which generated hydrogen gas is passed to its desired end use. If desired, the upper body portion can also contain a baffle 25 to remove solids and liquids entrained in the product gas, and a dessicant 27 through which the generated gas passes prior to reaching the exterior. A second body section 29 having a fuel chamber 31 is arranged contiguous to the first body section 11 and the two body portions are sealably separated by a conical shaped trap 33. A sealable inlet means 35 is provided in a wall of the second body section 29 to provide access to the fuel chamber for filling and cleaning. The second body section 29 is also provided with a passage 37 connecting the lower portion of the fuel chamber 31 to the lower portion of the reaction chamber 13, a block valve 39 opening passage 37 from said fuel chamber 29 to said reaction chamber 13, a capillary 40 and a check valve 41.

In the embodiments shown in the drawing, the trap 33 is conical shaped and separates the reaction chamber 13 from the fuel chamber 31. Access from the fuel chamber to the reaction chamber is made through the trap by way of passage 37, block valve 39, capillary 40 and check valve 41. The trap is filled with a liquid which is inert to all the reactants and products and whose density is substantially greater than that of the reactants. For all practical purposes, mercury has been found to fulfill the necessary requirements. In practice, the fuel enters the trap through check valve 41 at a point below the mercury surface level. The check valve serves to prevent mercury from entering the fuel chamber by way of capillary 40. Additionally, the capillary is wide enough to permit flow of fuel which will satisfy hydrogen requirements, but at the same time narrow enough to prevent a surge of fuel to the reaction chamber.

Contiguous to the first body section is the second body section 29 containing the fuel chamber 31. Although a wide variety of fuels can be employed, as hereinafter indicated, the preferred fuel for use as the source of hydrogen are certain borohydride adducts as hereinafter defined. The fuel is utilized in the apparatus of this invention in liquid form.

In some instances, depending upon the use of the generated gas, it might be desirable to pass the hydrogen through a filter and/or a dessicant prior to its leaving the generator. A drying unit can easily be built into the apparatus just below the first regulatable flow restrictor as shown in the drawing, or, if desired, attached as a separate unit outside of the generator.

In practice, the hydrogen generator is easily charged and when in operation provides a flow of hydrogen gas, the rate of which varies automatically as required to satisfy the consumption rate. Referring to the drawing and the description which follows, it will be seen that the apparatus is relatively simple to operate and provides features not previously found in gas generators.

Prior to its use, the trap 33 is filled with mercury. Thereafter the reaction chamber 13 is approximately two-thirds filled with an aqueous solution of an inorganic acid such as 10 weight percent sulfuric acid, and the fuel chamber 31 is filled with the liquid organic borohydride. Thereafter, the fuel chamber is slightly pressurized to a few atmospheres by the addition of an inert gas such as nitrogen. Pressurization should be such as to insure a minimum pressure of about 20 pounds per square inch gauge in the empty fuel chamber. When it is desired to generate hydrogen, block valves 17 and 39 are opened. The pressure in the fuel chamber forces the liquid fuel up through passage 37, block valve 39, capillary 40, check valve 41, and through the mercury trap 33 to the reaction chamber 13 where it contacts the acid solution and decomposes to give off hydrogen gas. When the hydrogen gas is withdrawn from the generator at a rate substantially less than the rate at which it is generated, the pressure of the gas increases in the reaction chamber and closes check valve 41. Thus, as the amount of the fuel in contact with the acid solution decreases, the rate of hydrogen generation likewise decreases. Similarly, if large quantities of gas are withdrawn from the generator, the hydrogen pressure in the reaction chamber will be low enough to permit valve 41 to remain open and again fuel is admitted into the reaction chamber where additional hydrogen is generated. Thus, once block valves 17 and 39 are opened and the unit started, the fuel will flow from the fuel chamber to the reaction chamber at a rate determined by the difference in pressure between the two chambers until the increased pressure in the upper chamber closes the check valve.

As previously indicated the generator of this invention utilizes as a source of hydrogen gas, certain organic compounds which although capable of liberating extremely large amounts of hydrogen at controlled rates have the disadvantage of leaving an insoluble by-product residue. In practice, it has been found that if the liquid organic borohydride adduct is introduced directly into the aqueous acid solution, after a short period of operation, the fuel feed lines become plugged due to the formation of insoluble residues at the point of contact with the acid. This results in either erratic hydrogen generation or no generation at all.

However, the apparatus of the present invention is designed to avoid residue formation which plugs or fouls the fuel feed line. This is accomplished by having the fuel pass through the mercury trap prior to its contact with the acid solution. In this manner, the fuel which enters the trap from a relatively narrow orifice is dispersed over a relatively wide surface area prior to its contact with the acid solution. Moreover any residue which is formed by acid-fuel contact is likewise dispersed over a wide area and is less likely to interfere with subsequent reaction between fuel and acid.

To facilitate contact between the reactants and prevent plugging of the feed inlet line, the fuel is added to the hydrolysis reagent in the reaction chamber with the feed line below the surface of a high density liquid, such as mercury, forming a layer below the hydrolysis reagent. In this manner, the high density liquid forms a barrier between the reaction zone and the fuel inlet, thereby preventing formation of solids at the point of addition.

As hereinbefore indicated, the apparatus of this invention is useful in applications requiring a relatively constant flow of hydrogen gas. Moreover, inasmuch as the apparatus is a lightweight, self-contained unit, it can be transported easily and hence, is suitable for use in those areas where hydrogen gas is not readily available from other sources. Due to its compact nature, this apparatus is also particularly useful as a source of hydrogen gas for the operation of fuel cells.

For example, it was found that a generator constructed in accordance with the teachings of this invention was capable of supplying sufficient hydrogen at a minimum pressure of 50 pounds per square inch gauge to operate a 100 watt fuel cell battery for 6 hours at a product gas rate of approximately 1.0 standard liter per minute.

Several experiments were conducted in an apparatus similar to that shown in the drawing. It was a two chambered cylindrical vessel of stainless steel having a length of approximately 17 inches and an overall diameter of 4 inches.

In one experiment a generator was charged with 180 milliliters of a mixture of an adduct of aluminum borohydride with monomethylamine and an adduct of aluminum borohydride with dimethylamine, 10 milliliters of xylene, and 720 milliliters of 10 weight percent sulfuric acid. This generator ran for a period of 5 hours and 35 minutes and delivered 0.93 standard liter per minute of hydrogen at a pressure in excess of 50 pounds per square inch gauge. In another experiment, the generator was charged with 200 milliliters of a mixture of an adduct of aluminum borohydride with monomethylamine and an adduct of aluminum borohydride with dimethylamine, 10 milliliters of xylene and 800 milliliters of 10 weight percent sulfuric acid and operated for 4 hours and 58 minutes at the desired rate and pressure. During this test a study was made of the performance of the generator with intermittent operation. The generator was run for 120 minutes, shutdown for 37 minutes, run for 10 minutes, shutdown for 45 minutes, run for 120 minutes, shutdown for 10 minutes, then run until all the fuel was consumed. Pressure fluctuations in the reaction vessel were about 1 to 2 pounds per square inch gauge in all tests. A filter cartridge was employed in these tests and consisted of about 110 grams of silica gel sandwiched between two sheets of Gelman Versapor Epoxy Membrane having a 5 micron pore size.

As hereinbefore indicated, the compositions which are employed in this invention are adducts of metal borohydride, i.e., aluminum borohydride, beryllium borohydride, or zirconium borohydride, with an organic nitrogen compound which is composed solely of carbon, hydrogen, and nitrogen atoms.

In view of the large volume of hydrogen gas which can be released by the metal borohydride adducts, generators which employ these compositions are particularly attractive and can be designed with a minimum of weight and space requirements. Moreover, due to the thermal stability and chemical reactivity of the adducts, their use is particularly attractive and far less hazardous than the corresponding metal borohydrides per se. As previously indicated these compositions decompose when reacted with acid to give hydrogen and an undesirable solid reaction product. However, the particular design of the generator of this invention overcomes the numerous problems presented by a solid by-product and plugging and fouling of lines is avoided.

The organic nitrogen compounds which are employed as reagents in the preparation of the adducts contain at least one nitrogen atom which functions as a Lewis base. In accordance with the Werner coordination theory, these organic nitrogen compounds can be classified as ligands in that the resulting adducts, from a structural interpretation, can be characterized as containing at least one nitrogen to metal coordinate bond. It should be noted that if the organic nitrogen compound contains more than one nitrogen atom which can function as a Lewis base, at least one of said nitrogen atoms is coordinately bonded to metal (of the metal borohydride). In addition, the metal atom (of the metal borohydride) can be coordinately bonded to more than one nitrogen atom which function as a Lewis base. However, as indicated previously, the organic nitrogen compound must contain at least one nitrogen atom which functions as a Lewis base. It is preferred that the metal borohydride be aluminum borohydride or beryllium borohydride. Aluminum borohydride is especially preferred. It is further preferred that the organic nitrogen compound be an organic nitrogen compound which contains up to 6 nitrogen atoms in the molecule, and preferably still, a single nitrogen atom in the molecule. It is preferred, also, that any hydrocarbon substituents which are monovalently bonded to the nitrogen atom contain up to 12 carbon atoms, and preferably still, up to 3 carbon atoms. Methyl substituents on the nitrogen atom are highly preferred. It is further pointed out that the word "adduct(s)," as used herein is employed in its broadest sense and encompasses within its scope complexes, coordination compounds, chelates, and the like.

Preferred organic nitrogen compounds which can be employed include, for example, the mono- the di- and the trialkylamines, and mixtures thereof, such as methylamine, ethylamine, n-propylamine, isopropylamine, n-butylamine, isobutylamine, t-butylamine, 2-ethylhexylamine dodecylamine, dimethylamine, diethylamine, di-n-propylamine, diisopropylamine, di-n-butylamine, diiso-butylamine, di-t-butylamine, di-2-ethylhexylamine, dido-decylamine, and the like; and the trialkylamines, e.g., trimethylamine, triethylamine, triisopropylamine, tri-n-propylamine, tri-n-butylamine, tri-t-butylamine, tri-2-ethylhexylamine, tridodecylamine, and the like.

Illustrative adducts which can be employed in the fuel cells of the present invention include, among others, methylamine monoaluminum borohydride,
dimethylamine monoaluminum borohydride,
aniline monoaluminum borohydride,
piperidine monoaluminum borohydride,
methylamine monoaluminum borohydride,
trimethylamine beryllium borohydride,
triethylamine beryllium borohydride,
methylamine zirconium borohydride,
dimethyl zirconium borohydride,
trimethylamine zirconium borohydride, and the like.

The adducts which are used in the generators of this invention can be prepared by contacting the metal borohydride with the organic nitrogen compound under an inert, anhydrous atmosphere, e.g., hydrogen, nitrogen, argon, helium, krypton and the like. It is essential that impurities such as oxygen, carbon dioxide, carbon monoxide, water, and other materials which are reactive with the metal borohydride be avoided in the system in view of the highly hazardous and explosive nature of the borohydride reagent. The operative temperature can be in the range of from about $-64°$ C., and lower, to below the boiling point of aluminum borohydride, e.g., from about $-64°$ C. to 43° C. A preferred temperature range is from about 0° C. to about 30° C., and preferably still, from about 15° C. to about 25° C. The order of addition of the reagents does not appear to be narrowly critical. However, it is preferred that the metal borohydride be added to the organic nitrogen compound. Incremental isothermal addition of the metal borohydride to the nitrogen compound, with slow stirring, is highly preferred. If desired, the reaction mixture can be cooled to maintain the desired reaction temperature. The operative pressure can be subatmospheric, atmospheric, or moderately superatmospheric. In general, suitable results have been obtained by conducting the reaction below about 760 mm. of Hg pressure. It is preferred that the operative pressure be in the range of from about $10^{-3}$ mm. of Hg to about 760 mm. of Hg. For relatively large batch production of the novel adducts, it was observed that satisfactory results were obtained by effecting the reaction under essentially atmospheric pressure.

In view of the hazardous nature of metal borohydride, it is not preferred to have a large excess of unreacted metal borohydride present in the reaction product mixture. In the preparation of the liquid adducts, the preferred maximum concentration of metal borohydride is in slight excess of that quantity which is necessary to react with the organic nitrogen compound to produce the desired liquid adduct. On the other hand, when employing relatively high boiling organic nitrogen compounds to prepare the novel liquid adducts, the presence of unreacted nitrogen compound in the resulting reaction product mixture is undesirable since the resolution of said mixture, by distillation, could result in the thermal decomposition of the liquid adduct product. However, this disadvantage does not present itself when the resulting product is a solid adduct. In such cases, the solid adduct, if insoluble in the reaction product mixture, is readily recovered therefrom via filtration techniques. Should the solid adduct be soluble in the reaction product mixture, the addition of an inert, normally-liquid, organic vehicle thereto in which the solid adduct product is insoluble and the relatively high boiling organic nitrogen compound is miscible, would result in the precipitation of said solid adduct. The solid adduct then could be recovered by filtration procedures. Subject to the variables, as indicated previously, it is desirable to employ an amount of metal borohydride which is slightly in excess of that required to react with the total amount of organic nitrogen compound to product the desired liquid adduct, whereas it is desirable to employ an amount of organic nitrogen compound which is moderately in excess of that required to react with the total amount of metal borohydride to produce the desired solid adducts. However, it is preferred to employ essentially stoichiometric amounts of the reagents.

The reaction period will depend, to a significant extent, upon various factors such as the choice of organic nitrogen compound and metal borohydride, the concentration of the reactants, the operative temperature, the operative pressure, the manner of addition of the reactants, the use of an inert, normally-liquid, organic vehicle, and other considerations. Depending upon the correlation of the variables illustrated supra, the reaction period can range from several minutes to a few days. However, highly satisfactory results have been obtained by conducting the reaction over a period of from about 0.5 hour, and lower, to about 6 hours, and higher.

If desired, the reaction can be effected in the presence of an inert normally-liquid, organic vehicle, i.e., a vehicle which is non-reactive with the reagents or the resulting novel adduct product. Illustrative vehicles include, for example, the normally-liquid saturated aliphatic and cyclo-aliphatic hydrocarbons, e.g., n-pentane, n-hexane, n-heptane, isooctane, n-octane, cyclopentane, cyclohexane, cycloheptane, methylcyclohexane, ethylcyclopentane, and the like; the aromatic hydrocarbons, e.g., benzene, toluene, xylene, ethylbenzene, and the like; and other inert, normally-liquid, organic vehicles which would become readily apparent to one skilled in the art. The use of an inert vehicle permits the heat of reaction to be more evenly dispersed, thus minimizing the danger of inadvertently causing thermal decomposition of unreacted metal borohydride. This advantage is especially desirable when employing large quantities of reagents.

The adduct product can be recovered from the reaction product mixture by various procedures known to the art. For example, excess reagent and inert vehicle, if any, can be recovered from the reaction product mixture by distillation under reduced pressure, e.g., 10 to 50 mm. of Hg. The novel solid adducts also can be recovered from the reaction product mixture by filtration or crystallization techniques. Vacuum distillation is a preferred method of recovering the novel adducts product providing it can be vacuum distilled without decomposition.

The following example is illustrative:

Example I

Five milliliters of dry benzene were transferred into a reaction flask equipped with a standard taper joint and a Teflon coated magnetic stirring bar. The reaction flask was then attached to a high vacuum system, cooled with a liquid nitrogen bath, and evacuated to at least $10^{-3}$ mm. of mercury. Methylamine, 1.11 moles, measured as a gas, was then transferred into the reaction flask. Aluminum borohydride was added, in increments, to the methylamine-benzene solution. After each addition, the liquid nitrogen bath was removed, the reaction flask was allowed to slowly warm to room temperature and stirring was initiated. The pressure changes were observed with a mercury manometer attached to the system. When pressure changes were no longer observed, the reaction flask was cooled with liquid nitrogen and any non-condensable gas collected in a Toepler pump. The reaction flask was then warmed to room temperature and the pressure recorded. The results are summarized below:

| $Al(BH_4)_3$ added cumulative, mmoles | Mole ratio $Al(BH_4)_3/CH_3NH_2$ | Total pressure, mm. of Hg | $H_2$ evolved cumulative, mmoles | Remarks |
|---|---|---|---|---|
| 0.260 | 0.234 | 99.0 | Trace | Traces of white solids noted. |
| 0.931 | 0.841 | 101 | 0.191 | |
| 1.13 | 1.01 | 101 | 0.191 | Removed benzene; product white solids with vapor pressure of 3.0 mm. Returned benzene to flask. No $Al(BH_4)_3$ recovered. |
| 1.53 | 1.38 | 105 | 0.246 | |
| 1.99 | 1.79 | 110 | 0.246 | |

In a similar manner, the dimethylamine adducts with aluminum borohydride are prepared.

Although the invention has been illustrated by the foregoing discussion, it is not to be construed as limited to the materials employed therein; but rather the invention encompassing the generic area as hereinbefore disclosed. Various modifications and embodiments of this invention can be made without departing from the spirit and scope thereof.

What is claimed is:

1. A portable, self-contained apparatus for the generation of hydrogen gas resulting from the hydrolysis of a liquid fuel, said apparatus having the ability to vary the hydrogen production rate automatically as required to satisfy a variable consumption rate, said apparatus comprising, in combination, a first body section comprising a reaction chamber, a first block valve connecting the upper portion of said reaction chamber with the exterior of the apparatus, a pressure relief valve, and a second body section contiguous to said first body section and comprising a pressurizable liquid fuel chamber, a sealable inlet means connecting said fuel chamber to the exterior of the apparatus, a passage extending from a point near the lower portion of said fuel chamber to the lower portion of said first body section and opening into said reaction chamber beneath a liquid barrier having a density greater than any of the reactants, a second block valve for opening said passage from said fuel chamber to said reaction chamber, and a check valve for controlling flow of fuel from said fuel chamber to said reaction chamber.

2. The apparatus of claim 1 wherein said liquid barrier is mercury.

3. A portable, self-contained apparatus for the generation of hydrogen gas resulting from the hydrolysis of a liquid fuel, said apparatus having the ability to vary the hydrogen production rate automatically as required to satisfy a variable consumption rate, said apparatus comprising, in combination, a first body section comprising a reaction chamber, means for regulating the flow of hydrogen gas from said reaction chamber to the exterior of the apparatus, and means for relieving pressure in said reaction chamber, and a second body section contiguous to said first body section and comprising a pressurizable liquid fuel chamber, means for connecting said fuel chamber to the exterior of the apparatus, means for the transfer of fuel from said fuel chamber to said reaction chamber, means for regulating the flow of fuel from said fuel chamber to said reaction chamber, and means comprising a liquid having a density greater than any of the reactants in said hydrolysis reaction disposed at the junction of said reaction chamber and said means for the transfer of fuel for preventing the formation of insoluble reaction products at the point of introduction of said fuel to said reaction chamber.

References Cited

UNITED STATES PATENTS 2,721,789  10/1955  Gill _____ 23—282
3,174,833  3/1965   Blackmer _____ 23—282

MORRIS O. WOLK, Primary Examiner

R.E. SERWIN, Assistant Examiner